United States Patent
Huang et al.

(10) Patent No.: US 6,915,022 B2
(45) Date of Patent: Jul. 5, 2005

(54) IMAGE PREPROCESSING METHOD CAPABLE OF INCREASING THE ACCURACY OF FACE DETECTION

(75) Inventors: Yea-Shuan Huang, Hsinchu Hsien (TW); Yao-Hong Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 621 days.

(21) Appl. No.: 10/131,200

(22) Filed: Apr. 25, 2002

(65) Prior Publication Data

US 2003/0133600 A1 Jul. 17, 2003

(30) Foreign Application Priority Data

Jan. 11, 2002 (TW) ........................... 91100283 A

(51) Int. Cl.$^7$ ............................................. G06K 9/40
(52) U.S. Cl. ........................................ 382/266; 382/274
(58) Field of Search ............................... 382/118, 170, 382/270–274, 266

(56) References Cited

U.S. PATENT DOCUMENTS 5,481,376 A * 1/1996 Kawashima ................. 382/274

OTHER PUBLICATIONS

Baxes, Gregory A., Digital Image Processiing, 1994, John Wiley & Sons, Inc., ISBN 0–471–00949–0, p. 328.*

Chin–Chuan Han, Hong–Yuan Mark Liao, Gwo–Jong Yu, Liang–Hua Chen; "Fast face detection via morphology–based pre–processing"; Nov. 5, 1998; pp. 1701–1712.

Henry A. Rowley, Student Member; IEEE, Shumeet Baluja, and Takeo Kanade, Fellow, IEEE; "Neural Network–Based Face Detection"; Jan. 1998; vol. 20, no. 1, pp. 23–38.

* cited by examiner

Primary Examiner—Yon J. Couso
Assistant Examiner—Sath Perungavoor
(74) Attorney, Agent, or Firm—Bacon & Thomas, PLLC

(57) ABSTRACT

The present invention discloses an image preprocessing method capable of increasing the accuracy of face detection by enhancing the contrast between dark pixels and their surrounding bright pixels, and increasing the brightness difference between dark pixels and bright pixels. Even in insufficient and non-uniform lighting conditions, the eye-analogue segments of a human face are obvious; so as to make a subsequent algorithm using eye-analogue segments for detecting human faces and producing more accurate results.

7 Claims, 3 Drawing Sheets

IMAGE PREPROCESSING METHOD CAPABLE OF INCREASING THE ACCURACY OF FACE DETECTION

BACKGROUND OF THE INVENTION

1. Field of the Invention

The present invention relates to the field of face detection and, more particularly, to an image preprocessing method capable of increasing the accuracy of face detection.

2. Description of Related Art

With the advent of computer technologies, real-time face detection and tracking have become an important issue in many applications including video surveillance, teleconferencing, video retrieval, virtual reality, human computer interactions, and so on. It is essential that a face detection algorithm can execute tasks fast and accurately. A known face detection algorithm, which is described in C. C. Han, H. Y Mark, K. C. Yu, and L. H. Chen, "Fast Face Detection via Morphology-Based Pre-Processing," Pattern Recognition 33, pp. 1701–1712, 2000, and incorporated herein for reference, has shown a very promising performance in both speed and accuracy when dealing with well lit face images. However, the Han's algorithm degrades considerably when images are taken in insufficient or non-uniform lighting conditions.

In the known patents, U.S. Pat. No. 5,012,522 proposes a face decision rule to find a face in an image by examining dark regions. U.S. Pat. No. 5,216,512 proposes a method using an image pick-up device with an image sensor having a rectangular area to locate a face. U.S. Pat. No. 5,596,362 describes a method to find a face candidate by using edge information and then to verify it by fitting with an ellipse. European Patent 0836326 includes a skin tone detector and an eye-nose-mouth region detector to improve the accuracy of the range of a face except fitting with an ellipse. U.S. Pat. No. 5,715,325 proposes a method to identify a face in an image by reducing the resolution, and then fitting a bounding box with the head region. U.S. Pat. No. 5,835,616 describes a method for face detection using templates, which first finds wrinkles and curved shapes of a facial image by blurring filter and edge enhancer, and then confirms the existence of the human face by finding facial features. However all the above results are limited to images with simple background or head-shoulder images and the detected regions are only rough approximations.

U.S. Pat. No. 5,642,431 describes a face detection system including pattern prototypes obtained by a network training process and distance measurement from the applied image to each of the prototypes. Afterwards, Rowley et al. proposed a more complete version for face detection by neural networks. A description of such can be found in H. Rowley, S. Baluja, and T. Kanade, "Neural Network-Based Face Detection," IEEE Trans. Pattern Analysis and Machine Intelligence, Vol. 20, No. 1, pp. 22–38, January 1998, and is hereby incorporated herein by reference. However the above results are based on the brute force search in the applied image, which is indeed a time-consuming procedure. Therefore it is desired for the above face detection method to be improved.

SUMMARY OF THE INVENTION

The object of the present invention is to provide an image preprocessing method capable of increasing the accuracy of face detection by locally enhancing the contrast between dark pixels and their surrounding bright pixels and increasing the brightness difference between dark pixels and bright pixels, so that a preprocessed image is much easier to derive from the eye-analogue segments.

To achieve the object, there is provided an image preprocessing method for processing an input image having a plurality of pixels arranged in an array form to increase the accuracy of subsequent face detections. A pixel at column m and row n of the input image has an image value f(m,n). The preprocessing method comprises the steps of. (A) for each pixel (m,n) of the input image, determining a sum $TOP^a(m,n)$ of PN pixels on row n−a closest to the pixel (m,n), and a sum $BOT^a(m,n)$ of the PN pixels on row n+a closest to the pixel (m,n), wherein PN is an integer of at least 2, and the superscript 'a' is a positive integer; (B) determining a difference DT(m,n) between the pixel (m,n) and the determined pixels on the row n−a by $DT(m,n)=PN*f(m,n)-TOP^a(m,n)$, and a difference DB(m,n) between the pixel (m,n) and the determined pixels on the row n+a by $DB(m,n)=PN*f(m,n)-BOT^a(m,n)$; (C) if $|DT(m,n)|>|DB(m,n)|$, providing an image difference DIF(m,n)=DT(m,n), otherwise, providing an image difference DIF(m,n)=DB(m,n); and (D) determining a temporary value T(m,n) of the pixel (m,n) by $T(m,n)=(\alpha*f(m,n)+DIF(m,n))/\beta$ for use as a new image value f'(m,n) of the pixel, where $\alpha$ is a positive enhancement factor and $\beta$ is a positive division factor to make the value of T(m,n) regularly range between 0 and a maximum gray-level.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
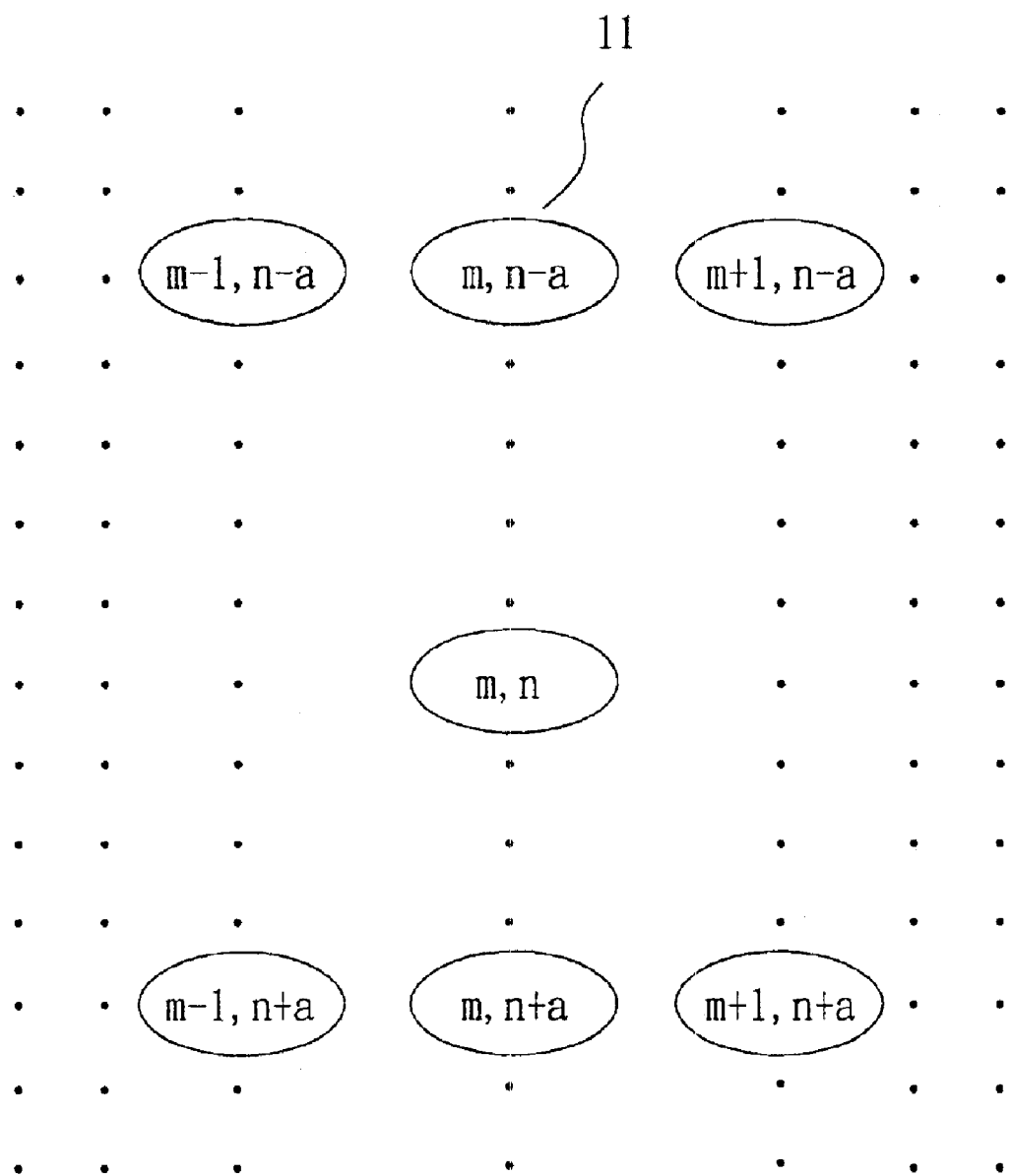
FIG. 1 shows the arrangement of pixels for an input image.

The image preprocessing method capable of increasing the accuracy of face detection in accordance with the present invention is provided to make a subsequent algorithm using eye-analogue segments for detecting human faces to produce a result with greater accuracy by enhancing the dark pixels. With reference to FIG. 1, there is shown the pixel arrangement of an input image, wherein the input image includes a plurality of pixels 11 arranged in an array form. For the pixel 11 of the input image at column m and row n, f(m,n) denotes the image value, such as brightness and gray-level, of this pixel (m,n).

Figure 2:
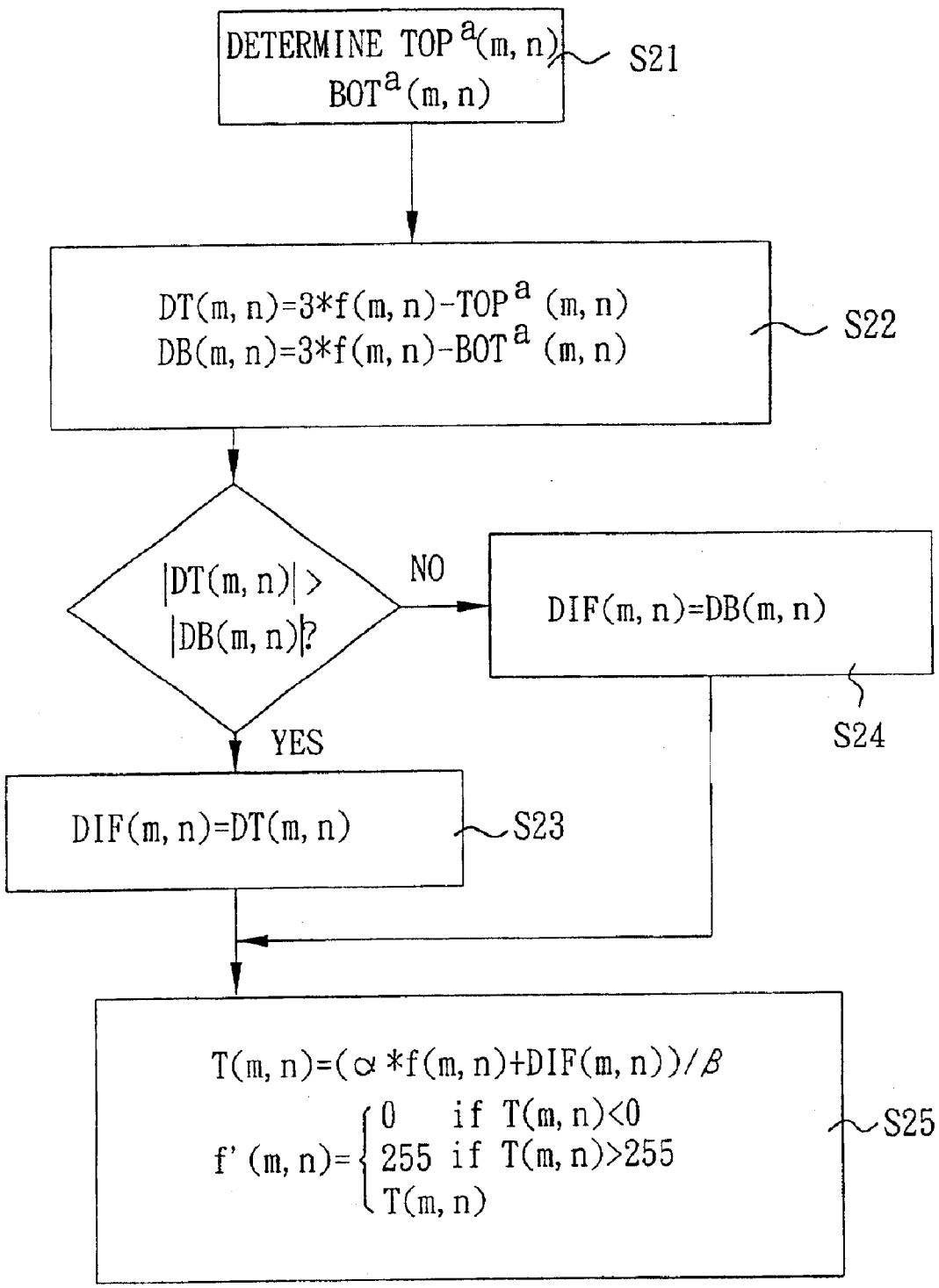
FIG. 2 shows a flowchart of the image preprocessing method capable of increasing the accuracy of face detection in accordance with the present invention.

FIG. 2 shows a flowchart of the image preprocessing method capable of increasing the accuracy of face detection in accordance with the present invention. In step S21, for the pixel (m,n), the sum of the PN pixels 11 on row n−a closest to the pixel (m,n) is determined, which is denoted as $TOP^a(m,n)$, and the sum of the PN pixels on row n+a closest to the pixel (m,n) is determined, which is denoted as $BOT^a(m,n)$, wherein PN is an integer of at least 2, preferably 3, and the superscript 'a' is a positive integer, for example 3 or 4. Therefore, we have:

$$TOP^a(m,n)=f(m-1,n-a)+f(m,n-a)+f(m+1,n-a);$$

$$BOT^a(m,n)=f(m-1,n+a)+f(m,n+a)+f(m+1,n+a).$$

In step S22, the difference between the pixel (m,n) and the pixels on the $row^{n-a}$ is determined by DT(m,n)=PN*f(m, n)−TOP$^a$(m,n), and the difference between the pixel (m,n) and the pixels on the row$^{n+a}$ is determined by DB(m,n)= PN*f(m,n)−BOT$^a$(m,n). If |DT(m,n)|>|DB(m,n)|, an image difference is determined by DIF(m,n)=DT(m,n) (step S23). Otherwise, the image difference is determined as DIF(m, n)=DB(m,n) (step S24).

In step S25, a temporary value of the pixel (m,n) is determined by T(m,n)=($\alpha$*f(m,n)+DIF(m,n))/$\beta$, where parameter $\alpha$ is a positive enhancement factor, for example 1.5, used to set the ratio of importance of the pixel brightness value compared with DIF(m,n), and parameter $\beta$ is a positive division factor, for example 0.9, used to scale the pixel values of the preprocessed image so that the value of T(m,n) regularly ranges between 0 and the maximum gray-level, for example 255. If T(m,n)<0, or T(m,n)>255, the new image value f'(m,n) of the pixel (m,n) is 0 or 255, correspondingly; otherwise, f'(m,n)=T(m,n). In accordance with the flowchart, the new image value of each pixel 11 in the input image can be determined.

In step S25, DIF(m,n) is a local operation which produces edge-oriented information for pixel (m,n) by computing the difference of pixel (m,n) with it's three closest neighboring pixels on either row n−a or row n+a. Obviously, pixel (m,n) belonging to a uniform image region will result in a close-to-zero DIF(m,n), and pixel (m,n) near to an edge area will get a large positive or large negative DIF(m,n). If pixel (m,n) is within the edge area of a dark region, DIF(m,n) is a negative value. On the contrary, if pixel (m,n) is within the edge area of a bright region, DIF(m,n) is a positive value. Therefore, the use of DIF(m,n) can enhance the contrast between dark pixels and their surrounding bright pixels and increase the brightness difference between dark pixels and bright pixels.

Figure 3:
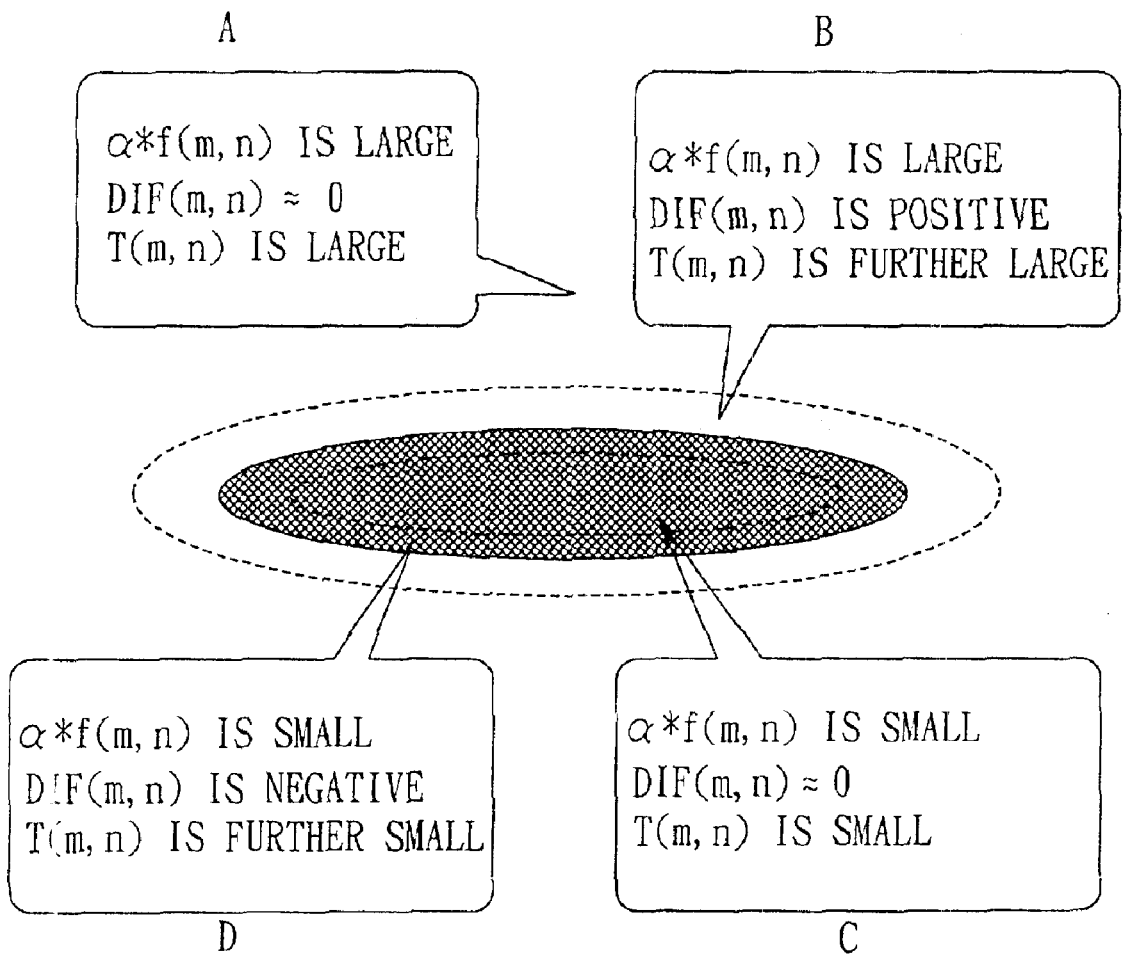
FIG. 3 schematically illustrates the use of present image preprocessing methods to process pixels at different locations.

FIG. 3 shows the use of the present image preprocessing method to process pixels 11 of the input image at different locations. As shown, if the pixel (m,n) belongs to a uniformly bright region (labeled as 'A'), its f(m,n) is still large and DIF(m,n) is near 0, so that $\alpha$*f(m,n) is large, and T(m,n) is large. If the pixel (m,n) belongs to a bright region (labeled as 'B') and is close to a dark region, its f(m,n) is large and DIF(m,n) is positive, so that $\alpha$*f(m,n) is large and T(m,n) is further large. If the pixel (m,n) belongs to an uniformly dark region (labeled as 'C'), its f(m,n) is small and DIF(m,n) is near 0, so that $\alpha$*f(m,n) is small and T(m,n) is still small. If the pixel (m,n) belongs to a dark region (labeled as 'D') and is close to a bright region, its f(m,n) is small and DIF(m,n) is negative, so that $\alpha$*f(m,n) is small and T(m,n) is further small. Accordingly, with the present method, the image value of pixel 11 in a uniform image region (A or C) is not particularly adjusted. However, the image value of the pixel in the border between a dark region and a bright region is adjusted to be further large or further small, thereby enhancing the contrast between dark pixels 11 and their surrounding bright pixels 11 and increasing the brightness difference between dark pixels 11 and bright pixels 11, so as to effectively increase the accuracy of the subsequent algorithm using eye-analogue segments for detecting human faces.

To verify the achievement of the present invention, an image database containing 11659 images, which involves 46 persons, was used to test the performance of the present image preprocessing method. These images were taken under varying lighting conditions. In the images the human faces were oriented in various directions and positioned arbitrarily. The size of a face and the facial expression were not strictly limited. A threshold T is defined to be D*(5/40), where D is the distance between the center of the two eyes. Three experiments have been performed: (1) detecting faces by Han's method without any image preprocessing, (2) detecting faces by Han's method with histogram equalization, and (3) detecting faces by Han's method with the present method. First, the three experiments were applied to process each image in the database, and many eye-analogue segments were generated. For image processing a success is defined as: if there is an eye-pair in the eye-analogue segments and the distance between the centers of the eye-analogue segments of the eye-pair and the one of the real eyes specified manually is less than the threshold T. The success rates, which are defined to be the number of success images over the total number of face images, of the first, the second, and the third experiments are 71.31% (8134/11659), 55.71% (6495/11659), and 94.86% (11059/11659) respectively. Therefore, it is known that the present method has better performance indeed.

Although the present invention has been explained in relation to its preferred embodiment, it is to be understood that many other possible modifications and variations can be made without departing from the spirit and scope of the invention as hereinafter claimed.

What is claimed is:

1. An image preprocessing method for processing an input image having a plurality of pixels arranged in an array form to increase the accuracy of a subsequent face detection, a pixel at column m and row n of the input image having an image value f(m,n), the preprocessing method comprising the steps of:

(A) for each pixel (m,n) of the input image, determining a sum TOP$^a$(m,n) of PN pixels on row n−a closest to the pixel (m,n), and a sum BOT$^a$(m,n) of the PN pixels on row n+a closest to the pixel (m,n), wherein PN is an integer of at least 2, and the superscript 'a' is a positive integer;

(B) determining a difference DT(m,n) between the pixel (m,n) and the determined pixels on the row n−a by DT(m,n)=PN*f(m,n)−TOP$^a$(m,n), and a difference DB(m,n) between the pixel (m,n) and the determined pixels on the row n+a by DB(m,n)=PN*f(m,n)−BOT$^a$(m,n);

(C) if |DT(m,n)|>|DB(m,n)|, providing an image difference DIF(m,n)=DT(m,n), otherwise, providing an image difference DIF(m,n)=DB(m,n); and (D) determining a temporary value T(m,n) of the pixel (m,n) by T(m,n)=($\alpha$*f(m,n)+DIF(m,n))/$\beta$ for use as a new image value f'(m,n) of the pixel, where $\alpha$ is a positive enhancement factor and $\beta$ is a positive division factor to make the value of T(m,n) range between 0 and a maximum gray-level.

2. The method as claimed in claim 1, wherein, in steps (A) and (B), PN is 3.

3. The method as claimed in claim 1, wherein, in step (D), the maximum gray-level is 255.

4. The method as claimed in claim 3, wherein, in step (D), if T(m,n)<0, the new image value f'(m,n) of the pixel (m,n) is 0, and if T(m,n)>255, the new image value f'(m,n) of the pixel (m,n) is 255.

5. The method as claimed in claim 3, wherein, in step (D), $\alpha$ is 1.5, and $\beta$ is 0.9.

6. The method as claimed in claim 2, wherein, in step (A), 'a' is 3 or 4.

7. The method as claimed in claim 1, wherein, in step (D), the image value f(m,n) includes brightness and gray-level information.

* * * * *